March 26, 1935.   E. F. ROSSMAN ET AL   1,995,901

SHOCK ABSORBER

Filed Jan. 16, 1933   2 Sheets-Sheet 1

INVENTORS
EDWIN F. ROSSMAN AND CARL H. KINDL
BY
Spencer, Hardman & Fehr
ATTORNEYS March 26, 1935. E. F. ROSSMAN ET AL 1,995,901
SHOCK ABSORBER
Filed Jan. 16, 1933 2 Sheets-Sheet 2

INVENTORS
EDWIN F. ROSSMAN AND CARL H. KINDL
BY
Spencer, Hardman & Fehr
ATTORNEYS Patented Mar. 26, 1935

1,995,901

UNITED STATES PATENT OFFICE 1,995,901

SHOCK ABSORBER

Edwin F. Rossman and Carl H. Kindl, Dayton, Ohio, assignors, by mesne assignments, to General Motors Corporation, Detroit, Mich., a corporation of Delaware Application January 16, 1933, Serial No. 651,918

23 Claims. (Cl. 188—88)

This invention relates to improvements in hydraulic shock absorbers adapted to control the relative movements of the frame and axles of a vehicle.

It is among the objects of the present invention to provide an hydraulic shock absorber capable of adjusting itself automatically in accordance with the nature of the road-bed over which the vehicle is being operated whereby said shock absorber will properly resist relative movements between the body and axles of the vehicle.

Another object of the invention is to provide the shock absorber with adjusting mechanism responsive only to accelerative movements of the vehicle body.

A still further object of the present invention is to have the shock absorber adjust itself only in response to accelerative movements upwardly of the vehicle body.

Further objects and advantages of the present invention will be apparent from the following description, reference being had to the accompanying drawings wherein a preferred embodiment of one form of the present invention is clearly shown.

While the vehicle is being operated over a comparatively smooth roadway such as a boulevard, slight movements of the body and axles obtain and thus the shock absorber should offer a minimum resistance to body and axle movements. Under these conditions the vehicle springs should provide adequate cushioning means. However, when a vehicle wheel strikes an elevation or sudden obstruction in the roadway it will be thrust upwardly toward the body which, however, due to its weight and inertia, will not correspondingly move upwardly. Failure of the body to move upwardly results in the compression of the vehicle spring beyond its normal load position, said increased spring pressure in turn reacting to move the body upwardly with an accelerative velocity until the spring reaches its normal load position relative to the frame. The inertia of the body will, however, cause its continued movement upwardly beyond the point at which the spring reaches its normal load position.

This upward movement of the vehicle axle is properly controlled by fluid flow control devices provided at the spring compression control end of the shock absorber. The separating movement of the axle and body which occurs when the spring has ceased to urge the body upwardly and the body however continues on its upward movement, is controlled by the spring rebound control end of the shock absorber where the automatic adjusting mechanism is provided. This mechanism is rendered effective by accelerations in the velocity of body movements upwardly whereby the fluid flow is controlled to increase the effective resistance of the shock absorber to such body movements. The mechanism is, however, ineffective to increase shock absorber resistance while the body is moving upwardly at a constant velocity.

The control mechanism in the present invention is shown comprising a valve operated by an inertia mass which in turn is held in properly balanced position by a spring. The forces produced by the vehicle spring, tending to accelerate body movements, act directly upon the inertia mass and its valve to adjust the shock absorber whereby its resistance to changes in the velocity of body movements is substantially increased.

Figure 1:
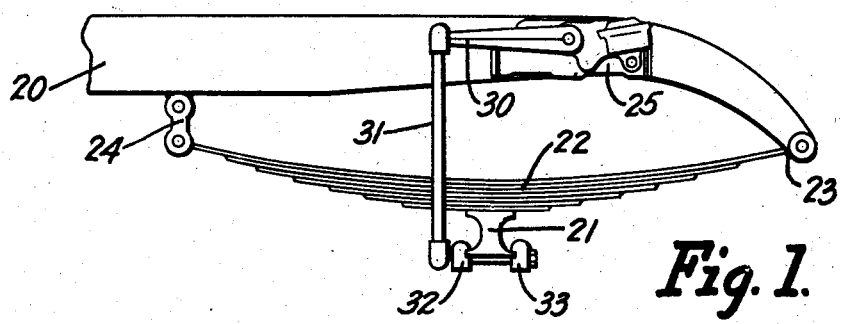
Fig. 1 is a fragmentary side view of the vehicle chassis, a shock absorber equipped with the present invention being shown applied thereto. The road wheels of the vehicle are not shown.

Referring to the drawings, the numeral 20 designates the frame of the vehicle upon which the body (not shown) is mounted. This frame is supported upon the vehicle axle 21 by springs 22 shown hinged to the frame at one end as at 23 and at the other end as at 24.

The shock absorber comprises a casing 25 providing a fluid reservoir 26 and a cylinder 27. In the present instance the two open ends of the cylinder are provided with cylinder end caps 28 properly gasketed to prevent leaks. A shaft 29 is journalled transversely of the shock absorber casing, one end of said shaft extending outside the shock absorber and having the operating arm 30 provided thereon, the free end of which is swivelly secured to one end of a link 31. The other end of this link is secured to a member 32 which is clamped to the axle 21 by a member 33. Within the shock absorber, shaft 29 has an operating lever 34, shown in dotted lines in Fig. 2, attached thereto so that it will be oscillatable with the shaft 29 in response to relative movements between the frame 20 and the axle 21 of the vehicle. It will be seen that as the frame and axle 20 and 21 respectively move toward each other the link connection 31 will tend to rotate arm 30 clockwise, resulting in a clockwise rotation of shaft 29 and a movement of lever 34 toward the left as regards Figs. 2 and 3. On the other hand, when members 20 and 21 of the vehicle move away from each other, a counter-clockwise rotation of shaft 29 will obtain, resulting in a movement of the lever 34 thereon toward the right as regards Figs. 2 and 3.

Figure 3:
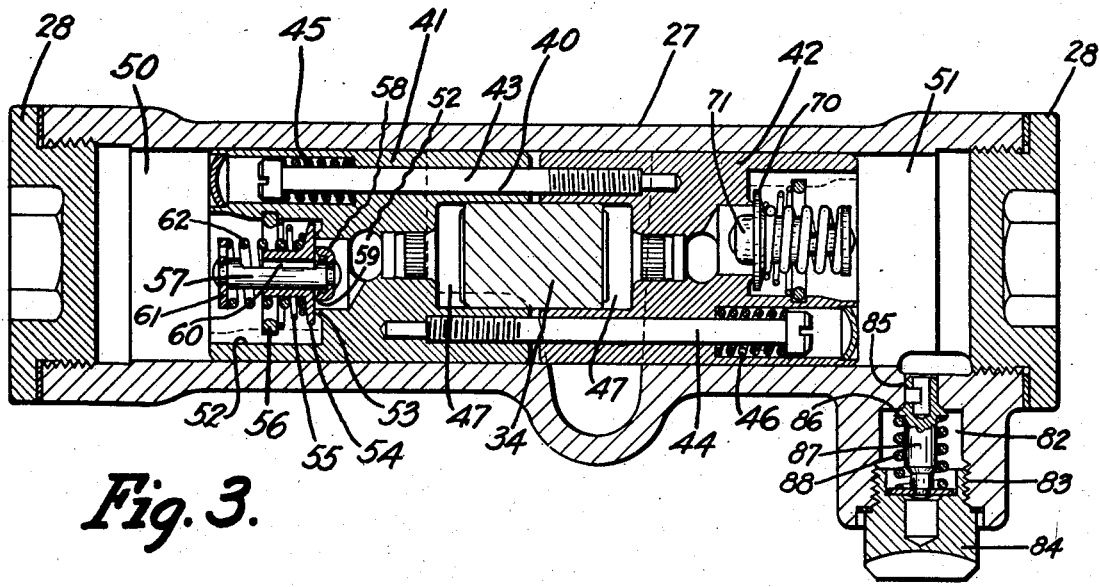
Fig. 3 is a longitudinal sectional view taken through the cylinder of the shock absorber substantially along the line 3—3 of Fig. 2.
Figure 4:
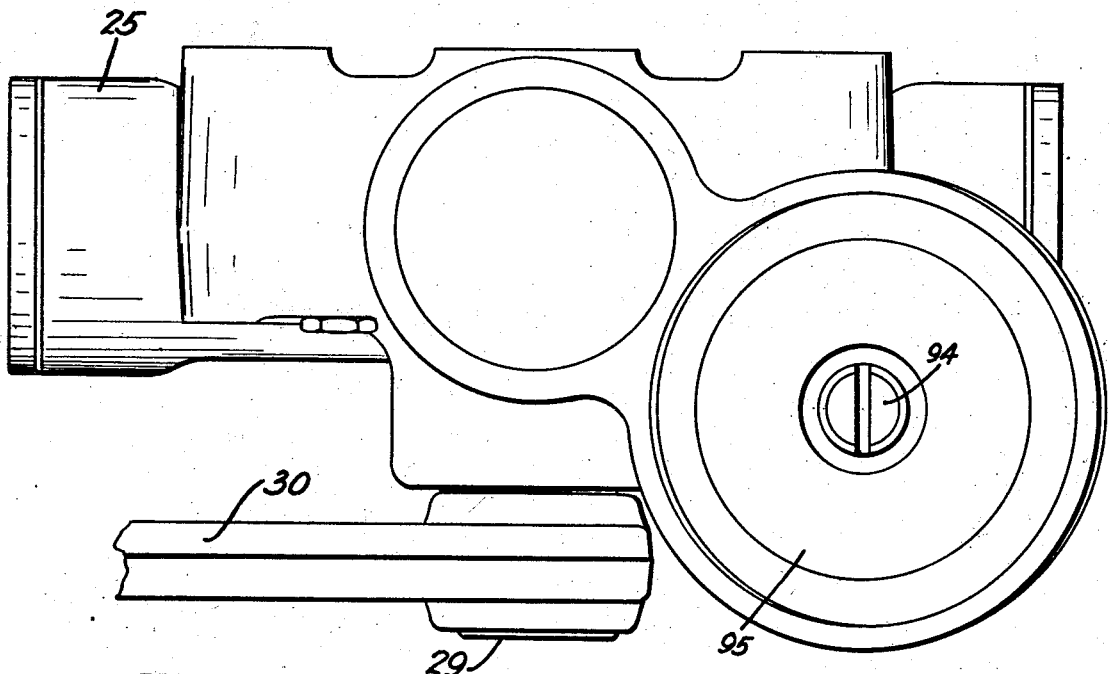
Fig. 4 is a plan view of the shock absorber.

Referring particularly to Fig. 3, the cylinder 27 has a piston 40 provided therein, said piston comprising head portions 41 and 42 secured together by bolts 43 and 44. Under the heads of each are located springs 45 and 46 respectively which tend to urge the piston head portions toward each other. The adjacent ends of the piston head portions are recessed to receive the free end of the lever 34 which directly engages wear-pieces 47 secured to the respective piston heads 41 and 42. The piston head 41 forms the spring compression control chamber 50 at one end of the cylinder, and the piston head portion 42 forms the spring rebound control chamber 51 at the opposite end of the cylinder. These chambers 50 and 51 are in communication with the intermediate chambers or reservoir 26 through ducts or passages in the respective piston head portions. The fluid flow through each of these ducts is controlled by a valve mechanism provided on each piston head portion, and inasmuch as both valve mechanisms are identical, only one will be described detailedly.

In the passage 52 of the piston head portion 41 (which passage connects chamber 50 with reservoir 26) there is provided an annular ridge 53 forming a valve seat for the intake valve 54 which is urged upon said seat by a spring 55. This spring is interposed between the valve 54 and abutment ring 56 fitting into an inner annular groove in the annular wall of the passage 52. Valve 54 has a tubular body portion in which the stem 57 of the pressure release valve is slidably supported. The portion of the stem 57 extending into the port within the seat 53 has a disc-head 58 secured thereto, said head having an annular flange provided with a sharp edge 59 adapted to seat upon the inner surface of the valve 54 to close a passage 60 formed by a longitudinal groove in the stem 57. At the end of the stem 57 opposite the head 58 an abutment collar 61 is anchored, against which one end of a spring 62 rests, the opposite end of this spring engaging valve 54 so that valve head 58 is yieldably urged against the valve 54 by this spring 62.

This compound valve mechanism functions in the following manner: In response to the movement of the piston head portion 41 away from the cylinder head 28 forming chamber 50, fluid from the reservoir will flow through the passage in piston head 41, move valve 54 against the effect of its comparatively light spring 55 to establish a substantially free flow of fluid past this valve into chamber 50. In response to a reverse movement of the piston 41 or, toward the cylinder head 28 forming chamber 50, pressure will be exerted upon the fluid within said chamber, and valve 54 will be urged upon its seat 53, while said fluid pressure, when attaining a proper value, will move valve stem 57 and its head 58 against the effect of spring 62 so that the annular edge of the head 58 is moved away from valve 54 to establish a flow through the passage 60 into the reservoir, this fluid being restricted, however, proportionately to the pressure within chamber 50. For purposes of later description of the entire shock absorber, the intake valve for the rebound control chamber 51 is designated by the numeral 70, the pressure release valve by the numeral 71.

In the casing there is provided a control chamber 80, having an interiorly threaded passage 81 leading therefrom substantially centrally thereof, into a duct or passage 82, which may be termed the static-valve chamber. This chamber is clearly shown in Fig. 2. One end of this chamber 82 is interiorly threaded as at 83 to receive a recessed plug 84, properly gasketed to prevent leaks. A passage 85 connects chamber 82 with the spring rebound control chamber 51, and inasmuch as passage 85 is of lesser diameter than the chamber 82, a shoulder 86 is formed to provide a seat for the flange of the static-valve 87. This static-valve 87 is urged upon the seat 86 by spring 88. This valve 87 is so constructed and arranged that it will permit no fluid to flow from chamber 82 into the rebound control chamber 51, yet, at a predetermined fluid pressure within chamber 51, in response to the movement of piston head portion 42 toward the cylinder head portion 28 forming chamber 51, this valve 87 will be moved against the effect of its spring 88 to establish a restricted flow through the passage 85 into the valve chamber 82 and consequently into the passage 81 which leads to the control chamber 80.

Figure 2:
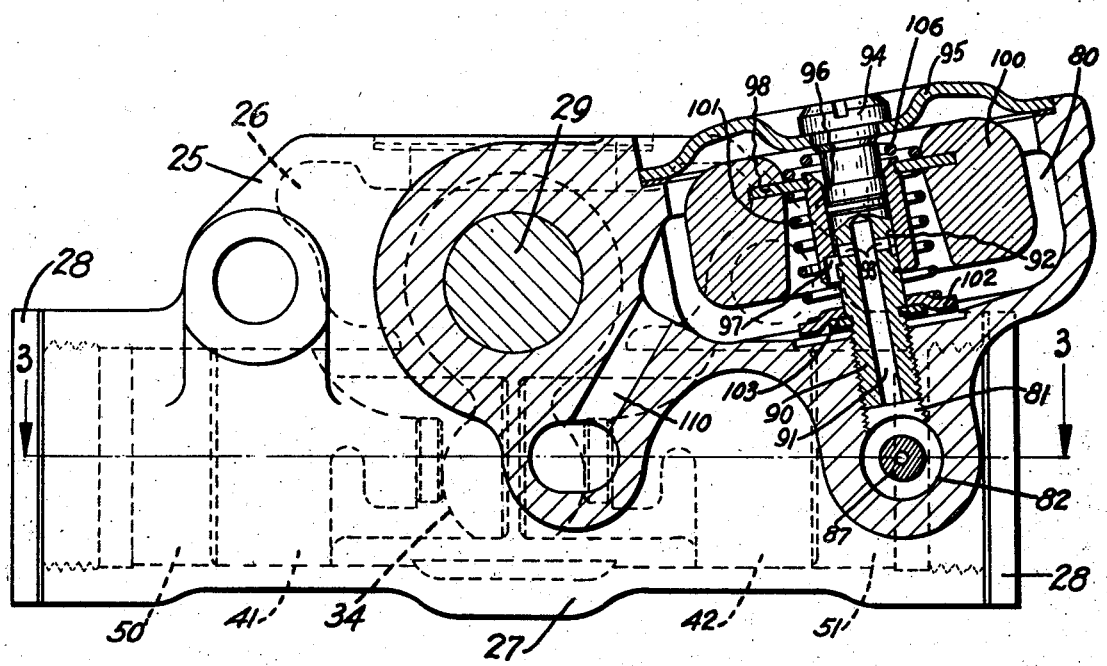
Fig. 2 illustrates the shock absorber in side elevation, a portion thereof being shown in section for purposes of illustrating the automatic control device thereof.

Referring now to the Fig. 2, passage 81 is shown to have one end of a plug or standpipe 90 threaded into it, this plug having a central passage 91 extending from the end of plug 90 in the passage 81 to within a short distance of the upper end of said plug. In the outer peripheral surface of the plug 90 and adjacent the inner end of its central passage 91 there is provided an annular groove 92 which is in communication with the inner central passage 91 through cross passages 93. A screw 94 is threadedly received by the upper, outer end of plug 90, this screw clamping a cover plate 95 upon the housing to provide a sealed cap for the chamber 80. A sleeve-valve 96 is slidably carried upon the plug 90, the lower end of this sleeve-valve having a recess 97 in one side of its interior annular wall, which recess, when valve 96 is in its normal position, is in constant communication with the annular groove 92 in the plug 90.

The provision of the recess 97 in the inner, annular wall of the valve 96 and especially on one side thereof, provides an unbalanced valve which will, in response to fluid pressure, tend to stick under certain conditions. The valve 96 fitting slidably upon plug 90 may be moved downwardly upon said plug and against the effect of spring 101 so that the upper edge of the recess 97, when aligning with the lower edge of the annular groove 92 in the plug, will close said groove and substantially stop fluid flow therefrom. The words "substantially stop" have been used, for it may clearly be seen that the sliding fit between valve 96 and plug 90 will not provide an absolute seal, but still the amount of fluid flow through this leak is practically negligible. Since the flow restricting surface provided by the annular wall of the valve diametrically opposite the recess 97 is considerably longer than the flow restricting surface immediately adjacent said recess, the fluid pressure being exerted through passages 93 into groove 92 will be more highly restricted at the longer surface than at the shorter surface adjacent the recess, thus the valve will be urged toward the side opposite said recess. This urging of the valve to one side will tend to cause it to stick in this fluid flow restricting position until the fluid pressure within the plug 90 has been eliminated, at which time spring 101 will return the valve 96 to its normal position. Sleeve-valve 96 has a bracket 98 secured thereto, said bracket providing an anchor for the inertia mass control element or weight 100. This weight is held in properly balanced position by a spring 101 which rests upon a collar 102 seated upon an abutment plate 103 carried by the plug 90. The other end of the spring engages bracket 98. This spring is so designed that it will normally maintain the inertia mass control element or weight 100 in proper balanced position, in which position the valve 96, attached thereto, has its side opening 97 in communication with the annular groove 92 in plug 90, as has been mentioned heretofore. A comparatively heavy spring 106 is interposed between the bracket 98 and the cover plate 95 to prevent upward movement of the weight 100 in response to an accelerative movement of the casing downwardly substantially in the direction of the axis of plug 90. A passage or duct 110 leads from the chamber 80 to the reservoir 26, as is clearly shown in Fig. 2.

The device operates to control body and axle movements in the following manner:

When a roadwheel of the vehicle strikes a raise or an obstruction in the highway, it is thrust upwardly toward the frame, thereby compressing its vehicle spring 22 beyond the normal load position. Movement of the axle 21 toward the frame 20 will, as has been mentioned heretofore, result in a movement of the piston 40 toward the left as regards Figs. 1, 2 and 3 and thus pressure will be exerted upon the fluid within the spring compression control chamber 50. The pressure in chamber 50, when sufficient, will urge valve head 58 from its seat upon valve 54 to establish a restricted flow of fluid from chamber 50 through the piston passage 52 into the reservoir 26, this restricted fluid flow resisting the movement of piston 40 toward the left and consequently resisting the compression movement of the spring 22. If the compression of spring 22 has been slight, the loading of the spring 22 will not be sufficient to thrust the body-carrying frame upwardly at a sufficiently accelerated rate and consequently the inertia weight valve will remain in its normal, ineffective position. As the spring 22 returns to its normal load position, reverse movement of the piston 40 will obtain, resulting in a pressure upon the fluid in the rebound control chamber 51 which will move valve 87 from seat 86 to establish a restricted flow of fluid from chamber 51 through passage 85 into chamber 82 thence from passage 81 through the passage 91 in plug 90 and then through cross passage 93, groove 92, side passage 97 in sleeve-valve 96 into the chamber 80 from where the fluid will return to the reservoir 26 through the duct 110.

If the spring 22 has been compressed beyond its normal load position, it will tend to throw the body-carrying frame 20 upwardly at an accelerated rate and consequently the inertia mass or weight 100, tending to remain immovable, will cause its sleeve-valve 96 to move relatively to the plug 90, said plug moving upwardly with the casing 25 of the shock absorber in response to the upward thrust of the frame 20. Upward movement of the frame 20 relatively to the axle 22 results in a separating movement between these two members and consequently the piston 40 is moved toward the right to exert pressure upon the fluid in the rebound control chamber 51. In response to this pressure in chamber 51, valve 87 will be moved from its seat to establish a flow into the chamber 82 and passages 81 and 91. However, as has been described heretofore, sleeve-valve 96 has moved relatively to plug 90 in response to the acceleration in the velocity of body movement, and consequently sleeve-valve 96 has closed the annular groove 92 so as to prevent fluid flow from passage 91 into chamber 80. Now, only the pressure release valve 71 is available to relieve the pressure within the chamber 51, and thus in response to pressure, valve 71 will be moved from engagement with its seat on valve 70 to establish a restricted flow from chamber 51 into the reservoir 26. It will of course be understood that the spring which urges valve 71 upon its seat is comparatively stiffer than spring 88 of valve 87 and consequently the restriction to the flow of fluid past valve 71 will be comparatively greater, thereby causing the shock absorber to provide a maximum resistance against the rebounding movement of the vehicle at this accelerated rate.

During the upward, accelerative movement of the vehicle body this maximum resistance by the shock absorber will substantially be maintained due to the unbalanced effect of valve 96 as has been described heretofore. If valve 96 were balanced, then spring 101 would return valve 96 to normal position as soon as upward accelerations of the car body movement were reduced to a predetermined value. However, with the unbalanced valve, the restriction to fluid flow is maintained substantially during the entire upward car body movement after accelerations have once moved the valve into restricting position and as long as pressure is maintained within plug 90. Of course as soon as piston 40 is moved to exert pressure upon the fluid in chamber 50, fluid pressure in chamber 51 is eliminated and consequently valve 96 would then be returned to its normal position by spring 101.

The automatic adjusting mechanism is so arranged that only accelerations in the upward movement of the vehicle body are effective to increase shock absorber resistance. Downward movements will not cause a movement of the inertia weight 100 due to the provision of the heavy spring 106. Even though weight 100 did move in response to downward accelerative movements of the car body, no shutting off of the fluid stream from cross passages 93 and thus no increase in restriction to the fluid flow would result.

It will of course be understood that the valve 87 may be provided with a spring 88 to furnish any degree of initial restriction to the fluid flow from chamber 51, yet valve 87 should in all cases offer less resistance to fluid flow from chamber 51 than the valve 71 in the piston, for valve 71 is intended to provide fluid flow control only in case the sleeve valve 96 closes annular groove 92, or in case valve 87 cannot properly relieve the fluid pressure within the chamber 51.

Figure 5:
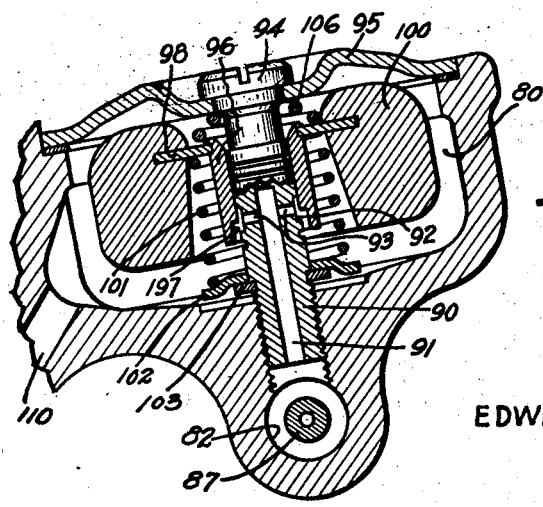
Fig. 5 is a fragmentary sectional view showing a modified form of inertia valve.

In Fig. 5 a modified form of valve 96 is shown. Here the valve is balanced for instead of having a recess 97 in its one side, an interior annular groove 197 is provided. Thus when the valve is moved downwardly to close groove 92 in plug 90, equal areas and equally long restricting or cut-off surfaces are presented to be acted upon by the fluid pressure from passage 93. This provides a balanced valve, which, as has been previously mentioned, will be returned to normal position by spring 101 when accelerations in the car body movement have been reduced to a predetermined degree.

From the aforegoing it may be seen that applicant has provided a shock absorber which is adapted properly to resist approaching movement between the frame and axle of the vehicle and also separating movements thereof. In the present invention the separating movements of these two elements of the vehicle are controlled in accordance with the nature of the road over which the vehicle is being operated, that is on even roads where the body movements are substantially constant, less resistance is offered by the shock absorber and the vehicle springs are dependent upon the control of such movements. However, in response to accelerated movement of the vehicle body, the automatic control mechanism is adapted to adjust the shock absorber to provide a maximum degree of resistance for controlling and resisting such acceleration in the velocity of body movements.

While the form of embodiment of the present invention as herein disclosed, constitutes a preferred form, it is to be understood that other forms might be adopted, all coming within the scope of the claims which follow.

What is claimed is as follows:

1. An hydraulic shock absorber comprising a casing providing a cylinder in which a piston forms a compression chamber; two ports leading from said chamber; a valve for each port adapted to be actuated by fluid pressure to permit a flow of fluid through each port; and inertia weight actuated means for closing one of said ports and rendering the valve therein completely immovable by fluid pressure in response to accelerative movements of the casing.

2. An hydraulic shock absorber comprising a casing providing a cylinder in which a piston forms a compression chamber; two ports leading from said chamber; a check valve normally closing each port and adapted, in response to fluid pressure, to establish a flow of fluid through its respective port; and means including an inertia mass and a control valve, adapted to discontinue the flow established by one of the check valves, in response to accelerative movements of the casing in one direction only.

3. An hydraulic shock absorber comprising a casing providing a cylinder in which a piston forms a compression chamber; two ports leading from said chamber; a pressure release valve in each port, adapted in response to predetermined fluid pressures in the respective ports to establish fluid flows therethrough, one of said valves operating at a lower fluid pressure than the other; and means adapted to be actuated by an inertia mass in response to vertical accelerations of the casing, to discontinue the flow through the port having the lower pressure valve, thereby to render said valve completely immovable by fluid pressure.

4. An hydraulic shock absorber comprising a casing providing a cylinder in which a piston forms a compression chamber; two ports leading from said chamber; a fluid flow control device for each of said ports, the one being a compound valve mechanism adapted to establish a substantially free flow of fluid through the port into the chamber as the piston moves in one direction and a restricted flow of fluid from the chamber through the port as the piston moves in the opposite direction, the device for the other port being adapted only to establish a restricted flow of fluid from the chamber in response to a comparatively lower fluid pressure in said chamber than the other valve; and an inertia mass controlled valve for controlling the flow established by the low pressure valve, in response to accelerative movements of the casing.

5. An hydraulic shock absorber comprising a casing providing a cylinder in which a piston forms a compression chamber; two ports leading from said chamber; a fluid flow control device for each of said ports, the one being a compound valve mechanism adapted to establish a substantially free flow of fluid through the port into the chamber as the piston moves in one direction and a restricted flow of fluid from the chamber through the port as the piston moves in the opposite direction; the device for the other port being adapted only to establish a restricted flow of fluid from the chamber in response to a comparatively lower fluid pressure in said chamber than the other valve; and an inertia mass controlled valve for completely shutting off the flow established by the low pressure valve, in response to accelerative movements of the casing in one direction only.

6. An hydraulic shock absorber for controlling the relative movements between the frame and axles of a vehicle, comprising in combination, a casing attachable to the frame of the vehicle and providing a fluid reservoir and a cylinder in the latter of which a piston forms a compression chamber; two separate ducts providing communication between the reservoir and compression chamber; a fluid flow control device in the one duct adapted, in response to a predetermined high fluid pressure within the chamber, to establish a flow of fluid therefrom through its respective duct; and two fluid flow control devices in the other duct, one for establishing a flow of fluid from the chamber through the duct in response to a comparatively lower fluid pressure in said chamber, the other to discontinue the flow through the duct in response to accelerative movements of the frame of the vehicle to which the casing is attached.

7. An hydraulic shock absorber for controlling the relative movements between the frame and axles of a vehicle, comprising in combination, a casing attachable to the frame of the vehicle and providing a fluid reservoir and a cylinder in the latter of which a piston forms a compression chamber; two separate ducts providing communication between the reservoir and compression chamber; a fluid flow control device in the one duct adapted in response to a predetermined high fluid pressure within the chamber to establish a flow of fluid therefrom through its respective duct; and two fluid flow control devices in the other duct, one normally closed, the other normally open, the one, adapted in response to a comparatively lower fluid pressure to open and establish a restricted flow from the chamber into the reservoir, the other being adapted to close and discontinue this flow, in response to accelerative movements of the vehicle frame in one direction.

8. An hydraulic shock absorber comprising a casing providing a reservoir and a cylinder in the latter of which a piston forms a compression chamber; a duct in the piston and a duct in the casing providing communication between the reservoir and compression chamber; pressure relief valves in both said ducts adapted, in response to fluid pressure, to establish restricted flows of fluid from the compression chamber into the reservoir; and an inertia mass controlled valve for shutting off the flow established by the valve in the casing duct, in response to accelerative movements of the casing.

9. An hydraulic shock absorber comprising a casing providing a fluid reservoir and a cylinder; a piston in said cylinder forming a compression chamber therein; ducts in the piston and casing connecting the reservoir and compression chamber; a fluid flow control device normally closing each duct and adapted in response to fluid pressure to establish restricted flows of fluid from the compression chamber into the reservoir; and means including an inertia mass, adapted, in response to accelerative movements of the casing in one direction, completely to close one of said ducts to render the fluid flow control device therein ineffective to continue its fluid flow in response to fluid pressure.

10. An hydraulic shock absorber comprising a casing providing a fluid reservoir and a cylinder; a piston in said cylinder forming a compression chamber therein; ducts in the piston and casing connecting the reservoir and compression chamber; a fluid flow control device normally closing each duct and adapted in response to fluid pressure to establish restricted flows of fluid from the compression chamber into the reservoir, one of said devices establishing its fluid flow at a comparatively lower fluid pressure than the other; and means including an inertia mass, adapted, in response to accelerative movements of the casing in one direction, to close the duct having the lower pressure valve, whereby said valve is rendered immovable by fluid pressure.

11. An hydraulic shock absorber comprising a casing providing a fluid reservoir and a cylinder; a piston in said cylinder forming a compression chamber therein; ducts in the piston and casing connecting the reservoir and compression chamber; a fluid flow control device normally closing each duct and adapted in response to fluid pressure to establish restricted flows of fluid from the compression chamber into the reservoir, the device closing the duct in the casing being adapted to establish its fluid at a comparatively lower fluid pressure than the device which closes the piston duct; and means including an inertia control mass adapted, in response to accelerative movements of the casing in one direction, to render the fluid flow control device in the casing immovable by fluid pressure by completely shutting off the duct containing said device.

12. An hydraulic shock absorber for controlling the approaching and separating movements of the frame and axles of a vehicle, comprising in combination, a casing adapted to be attached to the vehicle frame and providing a fluid reservoir and a cylinder; a piston in said cylinder operatively connected to a vehicle axle and forming a compression chamber at each end thereof; ducts in the piston connecting each compression chamber with the reservoir; a compound fluid flow control mechanism in each piston duct consisting of two valves, one of which is adapted to establish a substantially free flow of fluid from the reservoir into the respective compression chamber as the piston moves in one direction and the other of which is adapted to establish a restricted flow of fluid from the respective compression chamber in response to the movement of the piston in the opposite direction; a duct in the casing connecting one compression chamber with the reservoir; a valve normally closing said duct but responsive to fluid pressure in said chamber to establish a restricted flow of fluid therefrom; and an inertia mass controlled valve adapted to shut off said restricted flow in response to accelerative movements of the vehicle frame in one direction.

13. An hydraulic shock absorber for controlling the approaching and separating movements of the frame and axles of a vehicle, comprising in combination, a casing adapted to be attached to the vehicle frame and providing a fluid reservoir and a cylinder; a piston in said cylinder operatively connected to a vehicle axle and forming a compression chamber at each end thereof; ducts in the piston connecting each compression chamber with the reservoir; a compound fluid flow control mechanism in each piston duct consisting of two valves, one of which is adapted to establish a substantially free flow of fluid from the reservoir into the respective compression chamber as the piston moves in one direction and the other of which is adapted to establish a restricted flow of fluid from the respective compression chamber in response to the movement of the piston in the opposite direction; a duct in the casing connecting the reservoir and the compression chamber in which pressure is exerted upon the fluid during separating movements of the vehicle frame and axles; a valve normally closing said duct, but adapted to establish a restricted flow of fluid from said chamber in response to fluid pressure therein; and an inertia mass controlled valve adapted to close the duct and shut off said flow in response to vertical accelerative movements of the vehicle frame upwardly.

14. An hydraulic shock absorber for controlling the approaching and separating movements of a vehicle frame and axles comprising, a casing attached to the vehicle frame and providing a fluid reservoir and cylinder; a piston, operatively connected to a vehicle axle, and forming two compression chambers within the cylinder, said piston having valved ducts for establishing controlled fluid flows between the respective compression chambers and the reservoir; a control chamber in the casing in communication with both the reservoir and the compression chamber for controlling the separating movement of the vehicle frame and axle; a pressure release valve between said control chamber and compression chamber adapted, in response to a predetermined fluid pressure in the latter, to establish a flow of fluid therefrom into the control chamber; and an inertia mass controlled valve in said control chamber, adapted, in response to vertical accelerative movements of the vehicle frame upwardly, to shut off the flow of fluid into the control chamber.

15. An hydraulic shock absorber comprising, a casing providing a cylinder having a piston which forms a compression chamber therein; two ports leading from said chamber; a pressure release valve for each port; a normally open, unbalanced valve adapted to have the fluid flow established by one of the pressure release valves, flow through it; and an inertia mass adapted to close said unbalanced valve in response to accelerative movements of the casing in one direction.

16. An hydraulic shock absorber comprising, a casing providing a cylinder having a piston which forms a compression chamber therein; two ports leading from said chamber; a pressure release valve for each port, one of said valves operating at a lower fluid pressure than the other; a normally open, unbalanced valve adapted to receive and pass the fluid flow established by the lower pressure release valve; and an inertia weight connected to said unbalanced valve for closing it in response to accelerations in the movement of the casing in one direction.

17. An hydraulic shock absorber comprising, a casing providing a cylinder having a piston which forms a compression chamber therein; two ports leading from said chamber; a pressure release valve for each port; and means comprising an inertia mass controlled, unbalanced valve for shutting off the flow of fluid established by one of said pressure release valves, as the movements of the casing in one direction are accelerated beyond a predetermined velocity, the fluid pressure upon the unbalanced valve holding said valve in closed position while pressure is maintained against it.

18. An hydraulic shock absorber comprising, a casing providing a cylinder having a piston which forms a compression chamber therein; two ports leading from said chamber; a pressure release valve for each port, one of said valves operating at a lower fluid pressure than the other; and means comprising an inertia mass and a control valve having a greater fluid flow restricting surface on its one side than on its other, for shutting off the fluid flow established by the lower pressure release valve, as the movement of the casing in one direction is accelerated beyond a predetermined velocity, the fluid pressure upon said control valve holding said valve in shut position while said movements of the casing continue.

19. An hydraulic shock absorber having a casing providing a fluid reservoir and a cylinder in which a piston forms a displacement chamber; an outlet duct connecting said chamber with the reservoir; and means in said duct for controlling the flow of fluid through it, said means comprising a member yieldably urged to close the duct, but adapted to be actuated by fluid pressure to open said duct, and an inertia mass controlled member adapted to be actuated to close said duct in response to accelerations in the upward movement of the shock absorber.

20. An hydraulic shock absorber having a casing providing a fluid reservoir and a cylinder in which a piston forms a displacement chamber; an outlet duct connecting said chamber with the reservoir; and means in said duct for controlling the flow of fluid through it, said means comprising two independent valves, one spring-loaded normally to close the duct but adapted to be actuated by fluid pressure to open said duct, the other valve being adapted to be actuated in response to accelerations in the upward movement of the shock absorber, to close said duct completely.

21. An hydraulic shock absorber having a casing providing a fluid reservoir and a cylinder in which a piston forms a displacement chamber; an outlet duct connecting said chamber with the reservoir; and means in said duct for controlling the flow of fluid through it, said means comprising a pressure release valve yieldably urged normally to close the duct and an inertia mass controlled valve adapted, in response to accelerations in the upward movement of the shock absorber, to render said pressure release valve ineffective by completely closing the duct.

22. An hydraulic shock absorber having a casing providing a fluid reservoir and a cylinder in which a piston forms a displacement chamber; a control chamber in communication with the reservoir; an outlet port for the displacement chamber; a standpipe extending from the port into the control chamber; a spring-loaded valve normally closing the port but adapted to be actuated by fluid pressure within the displacement chamber to open communication between said chamber and the control chamber through the standpipe; and an inertia mass actuated valve on the standpipe, within the control chamber, for closing the standpipe to shut off its discharge into said control chamber.

23. An hydraulic shock absorber having a casing providing a fluid reservoir and a cylinder in which a piston forms a displacement chamber; a control chamber in communication with the reservoir and displacement chamber; means for introducing fluid into the displacement chamber in response to movement of the piston in one direction; a spring-loaded valve normally shutting off communication between the displacement and control chambers but adapted to be actuated by fluid pressure in the displacement chamber to establish a restricted flow of fluid from the displacement chamber into the control chamber in response to movement of the piston in the other direction; and an inertia mass controlled valve in the control chamber for shutting off communication between the displacement and control chambers in response to accelerations in the movement of the shock absorber casing upwardly.

EDWIN F. ROSSMAN.
CARL H. KINDL.